(12) United States Patent
Yu et al.

(10) Patent No.: US 8,152,253 B2
(45) Date of Patent: Apr. 10, 2012

(54) ANTI-FALLING APPARATUS FOR CABINETS

(75) Inventors: Mo-Ming Yu, Shenzhen (CN);
Wen-Feng Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 865 days.

(21) Appl. No.: 12/166,262

(22) Filed: Jul. 1, 2008

(65) Prior Publication Data

US 2009/0251038 A1 Oct. 8, 2009

(30) Foreign Application Priority Data

Apr. 3, 2008 (CN) .......................... 2008 1 0300838

(51) Int. Cl.
*A47B 91/00* (2006.01)

(52) U.S. Cl. .................... 312/351.1; 312/349

(58) Field of Classification Search ............... 312/351.1, 312/349, 273–275, 330.1, 334.23–334.47, 312/350, 216–222, 333; 248/188–188.91
See application file for complete search history.

(56) References Cited

U.S. PATENT DOCUMENTS

| | | | | |
|---|---|---|---|---|
| 2,607,649 | A | * | 8/1952 | Johnson .......................... 312/244 |
| 2,854,785 | A | * | 10/1958 | Sperlich ...................... 248/188.1 |
| 4,194,452 | A | * | 3/1980 | Crowther et al. ............. 108/138 |
| 4,197,685 | A | * | 4/1980 | Goulish et al. ................. 52/239 |
| 4,372,632 | A | * | 2/1983 | Villa et al. ..................... 312/311 |
| 4,687,262 | A | * | 8/1987 | St. Louis ........................ 312/276 |
| 4,836,624 | A | * | 6/1989 | Schwickrath ................. 312/216 |
| 5,176,437 | A | * | 1/1993 | Remington ................. 312/351.1 |
| 6,857,711 | B1 | * | 2/2005 | Straus ............................ 312/205 |
| 6,896,342 | B1 | * | 5/2005 | Cheng ........................... 312/221 |
| 2003/0209959 | A1 | * | 11/2003 | Shih-Long et al. ...... 312/334.46 |
| 2004/0174105 | A1 | * | 9/2004 | Hung ......................... 312/351.1 |
| 2005/0236535 | A1 | | 10/2005 | Maeda et al. |
| 2008/0087777 | A1 | * | 4/2008 | Christian et al. ........... 248/188.8 |

FOREIGN PATENT DOCUMENTS

| | | |
|---|---|---|
| AU | 492511 B2 | 4/1978 |
| EP | 0728429 A1 | 8/1996 |
| EP | 1138856 A1 | 10/2001 |

* cited by examiner

*Primary Examiner* — Darnell Jayne
*Assistant Examiner* — Timothy M Ayres
(74) *Attorney, Agent, or Firm* — Altis Law Group, Inc.

(57) ABSTRACT

An anti-falling apparatus for a cabinet includes a receiving member capable of being mounted to the cabinet. An extending arm is slidably received in the receiving member. The extending arm includes a first end a second end, and is capable of moving from a first position to a second position. A supporting sub-assembly is attached to the first end of the extending arm. A first distance from the first end to a top of the receiving member is greater than that a second distance from the second end to the top of the receiving member.

12 Claims, 6 Drawing Sheets

ANTI-FALLING APPARATUS FOR CABINETS

BACKGROUND

1. Field of the Invention

The present invention relates to an accessory of a cabinet. The invention particularly relates to an anti-falling apparatus for a server cabinet.

2. Description of Related Art

Generally speaking, a server is attached to two rail assemblies in a cabinet for the convenient attachment and maintenance of the server. The server can be drawn out of the cabinet conveniently like a drawer via the rail assemblies. When the drawn-out server is too heavy, the center of gravity of the cabinet shifts forward, thereby making the cabinet prone to fall. Screws or other stabilizing members standing on the floor are generally mounted to the bottom of the cabinet to prevent it from falling. However, it is inconvenient for screws to be used in a room having anti-static floor, since the stabilizing members are typically too big and too heavy to be conveniently used.

DETAILED DESCRIPTION

Figure 1:
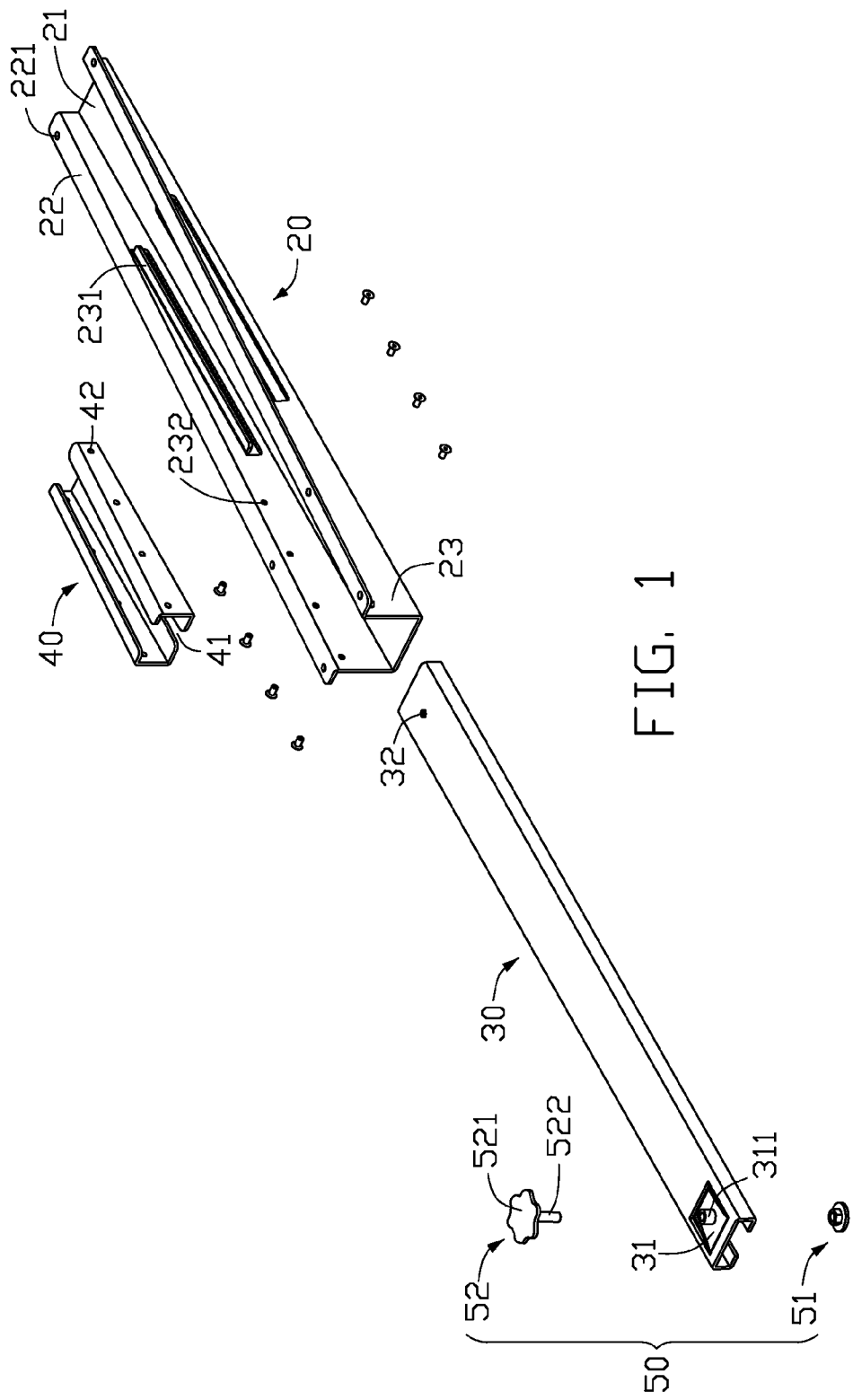
FIG. 1 is an exploded, isometric view of an anti-falling apparatus in accordance with an embodiment of the present invention.
Figure 2:
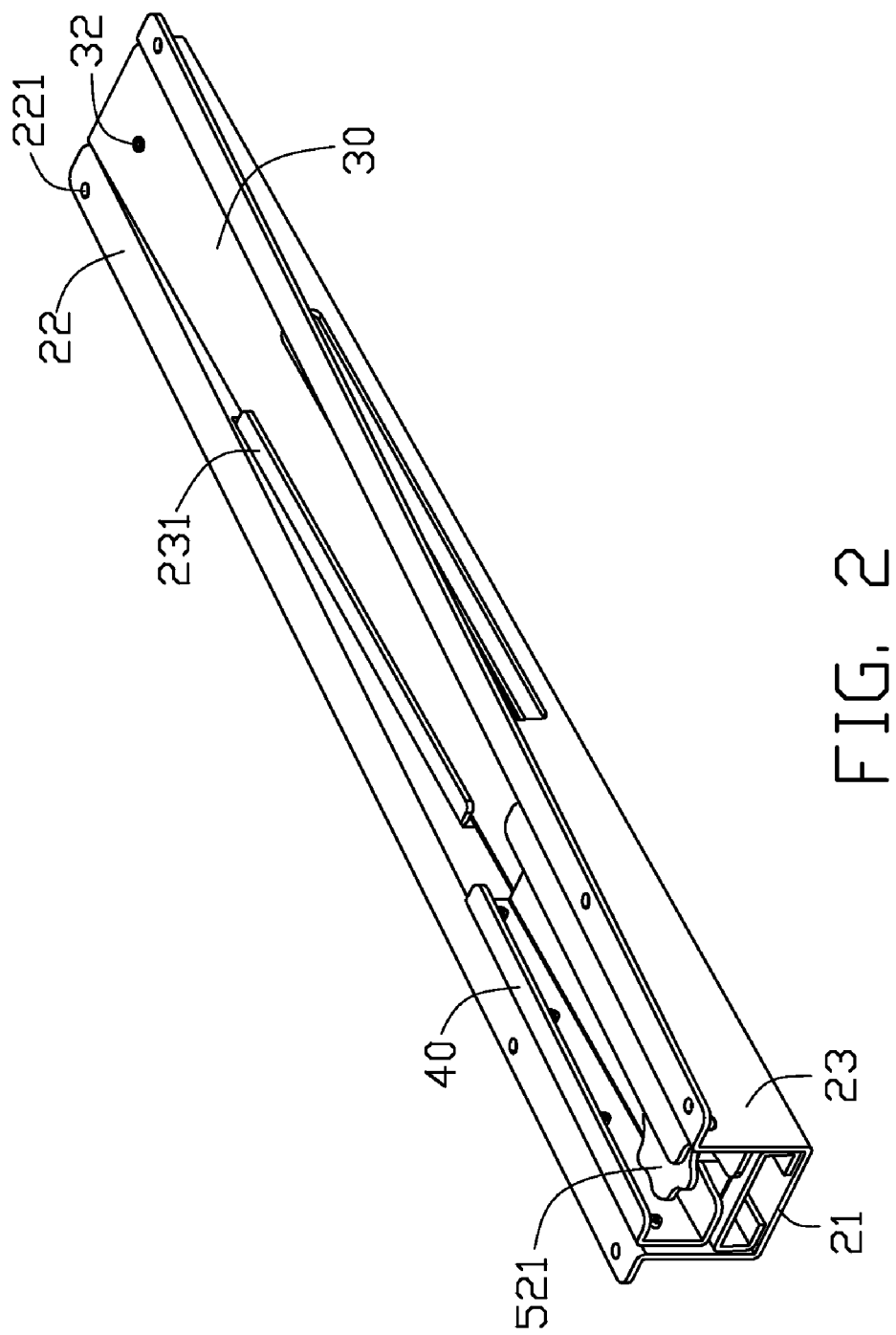
FIG. 2 is an assembled view of FIG. 1.
Figure 3:
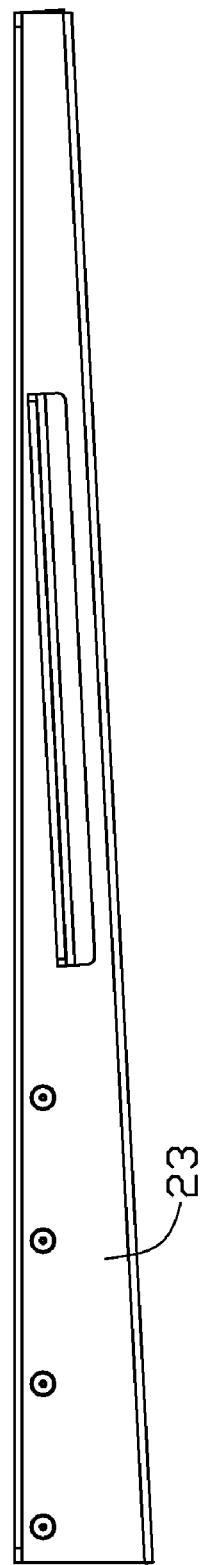
FIG. 3 is an elevated front view of FIG. 2.
Figure 6:
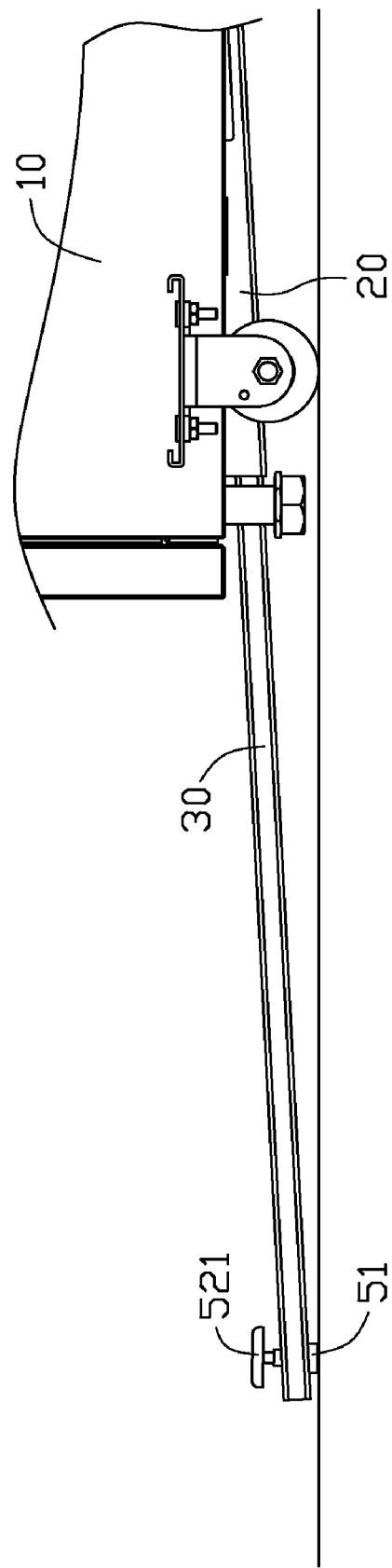

Referring to FIGS. 1 and 6, an anti-falling apparatus in accordance with an embodiment of the present invention is attached to the bottom of a cabinet 10. The anti-falling apparatus includes a receiving member 20, an extending arm 30, a blocking member 40, and a supporting sub-assembly 50.

The receiving member 20 includes a bottom plate 21, two parallel sidewalls 23 perpendicularly extending from opposite sides of the bottom plate 21, and two mounting portions 22 perpendicularly extending out from tops of the sidewalls 23. The sidewalls 23 are trapezial-shaped or trianglular-shaped. A first end of the receiving member 20 has a greater distance between the bottom plate 21 and one mounting portion 22 than that of a second end of the receiving member 20. The mounting portions 22 respectively define a plurality of holes 221 therein. Two locating portions 231 pointing towards each other perpendicularly extend from the middle part of the sidewalls 23. The sidewalls 23 define a plurality of holes 232 adjacent the first end of the receiving member 20.

The cross-section of the extending arm 30 is approximately C-shaped. A sunken surface 31 is formed at the first end of the extending arm 30, and a protrusion 32 protruding up from the second end of the extending arm 30. The sunken surface 31 is downwards slanting and parallel to the mounting portion 22 of the receiving member 20. A column-shaped supporting portion 311 extends up from the sunken surface 31. The supporting portion 311 defines a through screw hole along an axis thereof.

Figure 4:
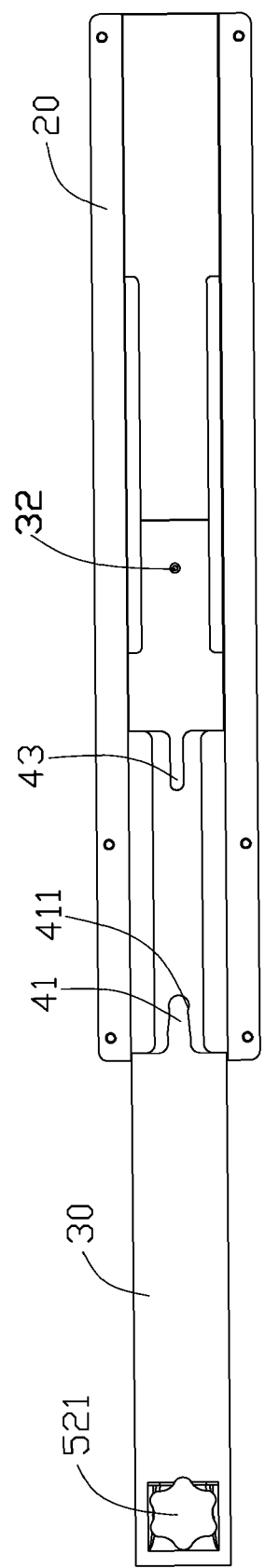
FIG. 4 is a top plan view of FIG. 3, but showing an extending arm of the anti-falling apparatus being pulled out.
Figure 5:
FIGS. 5 and 6 are assembled views of the anti-falling apparatus together with a cabinet, showing two using states.

Referring to FIGS. 1 and 4, the cross-section of the blocking member 40 is approximately C-shaped. The blocking member 40 includes a bottom plate and two sidewalls perpendicularly extending from opposite sides of the bottom plate. The sidewalls are trapezial-shaped or trianglular-shaped. A distance from the first end of the bottom plate to the top of one sidewall is greater than that from the second end of the bottom plate to the top of the sidewall. The first and second ends of the bottom plate define a clamping portion 41 and a blocking portion 43, respectively. The clamping portion 41 is a U-shaped opening whose entrance is greater than any other parts thereof. Two protrusions 411 pointing towards each other extend from opposite sides of the opening adjacent the close end. The blocking portion 43 is a U-shaped opening. The sidewalls of the blocking member 40 define a plurality of screw holes 42 corresponding to the holes 232 of the receiving member 20.

The supporting sub-assembly 50 includes a foot 51 and an adjusting member 52. The foot 51 is approximately discoid-shaped. A screw hole is defined in the middle of the foot 51. The adjusting member 52 includes a grip 521 and a screw 522 perpendicularly extending down from the middle of the grip 521.

Referring to FIGS. 1 to 5, the extending arm 30 is slidably received in the receiving member 20 and located under the locating portions 231 of the receiving member 20. The first end of the extending arm 30 is corresponding to the first end of the receiving member 20. The bottom plate of the blocking member 40 is placed on the extending arm 30, and the blocking member 40 is placed between two sidewalls 23 of the receiving member 20. The clamping portion 41 of the blocking member engages with the supporting portion 311 of the extending arm 30. A plurality of screws passes through the holes 232 of the receiving member 20 and the screw holes 42 of the blocking member 40 to fix the blocking member 40 to the receiving member 20. The screw 522 of the adjusting member 52 of the supporting sub-assembly 50 passes through the through screw hole of the supporting portion 311 of the extending arm 30, and screws into the screw hole the foot 51 of the supporting sub-assembly 50. The supporting portion 311 of the extending arm 30 is capable of being squeezed through the protrusions 411 of the clamping portion 41 of the blocking member 40, and the clamping portion 41 is capable of clamping the supporting portion 311 by its close end and the protrusions 411 to prevent the extending arm 30 from sliding out freely. The blocking portion 43 of the blocking member 40 is capable of blocking the protrusion 32 of the extending arm 30, when the extending arm 30 slides out of the receiving member 20. A plurality of screws passes through the holes 221 of the receiving member 20 to screw the receiving member 20 to the bottom of the cabinet 20.

Referring also to FIG. 6, during use, when some servers need to be drawn out of the cabinet 10, the extending arm 30 is drawn out of the receiving member 20. The supporting portion 311 of the extending arm 30 is disengaged from the clamping portion 41 of the blocking member 40. The grip 521 of the adjusting member 52 of the supporting sub-assembly 50 is rotated to adjust the height of the foot 51 until the foot 51 abuts against the ground to expand the area where the cabinet 10 meets the ground, for preventing the cabinet 10 from falling.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An anti-falling apparatus to prevent a cabinet standing on a supporting surface from tilting forwards, the anti-falling apparatus comprising:
   a receiving member attached to a bottom of the cabinet;
   an extending arm telescopically mounted to the receiving member; the extending arm comprising a first end and a second end opposite to the first end, and slidable in a direction slanting to the supporting surface, between a first position in which the extending arm is received in the receiving member, and a second position in which the extending arm extends forwards out of the receiving member;
   a supporting sub-assembly attached to the first end of the extending arm and operably resting on the supporting surface in response to the extending arm being in the second position;
   wherein a first distance from the first end to a top of the receiving member is greater than a second distance from the second end to the top of the receiving member;
   wherein the receiving member is bounded by a bottom plate, two trapezoidal-shaped perpendicularly sidewalls extending up from opposite sides of the bottom plate; one of the sidewalls comprises a locating portion extending inward therefrom, and the extending arm is located under the locating portion when in the first position.

2. The anti-falling apparatus as claimed in claim 1, wherein the receiving member further comprises two mounting portions perpendicularly extending out from tops of the sidewalls, and the mounting portions are fixed to the bottom of the cabinet.

3. An anti-falling apparatus to prevent a cabinet standing on a supporting surface from tilting forwards, the anti-falling apparatus comprising:
   a receiving member attached to a bottom of the cabinet;
   an extending arm telescopically mounted to the receiving member; the extending arm comprising a first end and a second end opposite to the first end, and slidable in a direction slanting to the supporting surface, between a first position in which the extending arm is received in the receiving member, and a second position in which the extending arm extends forwards out of the receiving member;
   a supporting sub-assembly attached to the first end of the extending arm and operably resting on the supporting surface in response to the extending arm being in the second position; and
   a blocking member attached to the receiving member;
   wherein the extending arm defines a supporting portion at the first end thereof, and the supporting portion defines a through screw hole; the supporting sub-assembly is engaged to the supporting portion via the screw hole;
   wherein the blocking member comprises a clamping portion capable of securing the supporting portion of the extending arm when in the first position.

4. The anti-falling apparatus as claimed in claim 3, wherein the clamping portion is a U-shaped opening with two protrusions extending towards each other from opposite sides of the U-shaped opening; and the supporting portion is secured at a closed end of the U-shaped opening when in the first position.

5. The anti-falling apparatus as claimed in claim 3, wherein a protrusion protrudes up from the second end of the extending arm and is blocked by the blocking member in the second position.

6. The anti-falling apparatus as claimed in claim 5, wherein the blocking member further comprises a blocking portion that abuts the extending arm protrusion in the second position.

7. The anti-falling apparatus as claimed in claim 6, wherein the blocking portion is U-shaped.

8. An anti-falling method for a cabinet standing on a supporting surface, comprising:
   providing:
      a receiving member fixed to a bottom of the cabinet;
      an extending arm slidably received in the receiving member, the extending arm comprising a first end and a second end opposite to the first end; and
      a supporting sub-assembly attached to the first end of the extending arm;
      wherein a first distance from the first end to a top of the receiving member is greater than a second distance from the second end to the top of the receiving member;
   sliding the extending arm in a direction slanting to the supporting surface, from a first position, where the extending arm is received in the receiving member, to a second position, where the extending arm extends out of the receiving member and the supporting sub-assembly is arranged in the front of cabinet;
   adjusting the supporting sub-assembly to make the supporting sub-assembly supported on the supporting surface; and
   providing a blocking member attached to the receiving member;
   wherein the sliding comprises moving the first end of the extending arm out of the receiving member;
   wherein when adjusting the supporting sub-assembly, an adjusting member is rotated in a through screw hole defined in a supporting portion of the extending arm;
   wherein the blocking member comprises a clamping portion securing the supporting portion of the extending arm when the extending arm is in the first position.

9. The anti-falling method as claimed in claim 8, wherein the sliding further comprises removing the supporting portion from the clamping portion.

10. The anti-falling method as claimed in claim 8, wherein the sliding further comprises pulling the extending arm until a protrusion that is located on the second end of the extending arm is blocked by a blocking portion of the blocking member.

11. The anti-falling method as claimed in claim 8, wherein when adjusting, a screw of the supporting sub-assembly is rotated.

12. The anti-falling method as claimed in claim 8, wherein the adjusting comprises rotating the adjusting member to make a foot rest against the supporting surface.

* * * * *